United States Patent [19]

Inoue

[11] Patent Number: 4,459,455
[45] Date of Patent: Jul. 10, 1984

[54] METHOD OF AND APPARATUS FOR CONTROLLING AN EDM PROCESS WITH SUCCESSIVELY DISPLACED MAGNETIC FIELD

[75] Inventor: Kiyoshi Inoue, Tokyo, Japan

[73] Assignee: Inoue-Japax Research Incorporated, Yokohama, Japan

[21] Appl. No.: 259,096

[22] Filed: Apr. 30, 1981

Related U.S. Application Data

[63] Continuation-in-part of Ser. No. 226,417, Jan. 19, 1981, Pat. No. 4,379,960, and a continuation-in-part of Ser. No. 150,355, May 16, 1980, Pat. No. 4,366,358.

[30] Foreign Application Priority Data

May 1, 1980 [JP] Japan ................................. 55-58916
May 14, 1980 [JP] Japan ................................. 55-64347
Jun. 10, 1980 [JP] Japan ................................. 55-78187
Jul. 3, 1980 [JP] Japan ................................. 55-90951

[51] Int. Cl.³ ............................................. B23P 1/08
[52] U.S. Cl. ................................ 219/69 M; 219/69 G
[58] Field of Search ................ 219/69 M, 69 G, 69 S, 219/69 V, 69 C; 204/129.1, 129.7

[56] References Cited

U.S. PATENT DOCUMENTS

3,710,067  1/1973  Ullmann et al. ................. 219/69 M

*Primary Examiner*—M. H. Paschall
*Attorney, Agent, or Firm*—Karl F. Ross; Herbert Dubno

[57] ABSTRACT

An EDM method and apparatus wherein a localized magnetic field is produced so as to be concentrated at least predominantly on a region of the EDM gap which constitutes only a limited portion of a preselected entire area of juxtaposition between the tool and workpiece electrodes. The region of concentration of the localized magnetic field is successively shifted to sweep it over the entire area of juxtaposition between the electrodes. A control device is provided to control at least one parameter of production and sweeping of the localized magnetic field in response to at least one process parameter of the EDM process.

31 Claims, 14 Drawing Figures

METHOD OF AND APPARATUS FOR CONTROLLING AN EDM PROCESS WITH SUCCESSIVELY DISPLACED MAGNETIC FIELD

COSS-REFERENCE TO RELATED APPLICATIONS

This application in part discloses and claims the subject matter disclosed in my U.S. patent applications Ser. No. 150,355 filed May 16, 1980 (U.S. Pat. No. 4,366,358 issued Dec. 28, 1982) and Ser. No. 226,417 filed Jan. 19, 1981 (U.S. Pat. No. 4,379,960 issued Apr. 12, 1983.

FIELD OF THE INVENTION

The present invention relates generally to the art of electrical discharge machining (EDM) in which a tool electrode is spacedly juxtaposed with a workpiece electrode to form a minute machining (EDM) gap in the presence of a machining medium (EDM liquid) therebetween and a succession of electrical pulses are applied between the tool electrode and the workpiece electrode to produce successively electrical discharges across the gap to electroerosively remove material from the workpiece electrode; as the material removal proceeds the latter and the tool electrode are advanced relatively towards one another to form a cavity or recess in the workpiece electrode. More particularly, the invention relates to an improved EDM control method and apparatus in which the interaction of the high-amperage electrical discharge and an externally applied magnetic field is utilized and applied in a novel manner in the EDM system constituted by the juxtaposed effective surfaces of the machining tool electrode and the machinable workpiece electrode in the gap and at which the EDM process proceeds.

BACKGROUND OF THE INVENTION

The proposal to use an externally applied magnetic field auxiliary in the EDM process dates back to an earlier stage in the EDM history. When a magnetic field is applied externally to the region of an EDM gap, it has been recognized that the ensuing magnetic flux interacts with the high-amperage electrical discharge current flow and causes on media generated in the gap certain dynamic actions which have not yet been fully explained. It has been recognized that these interactions facilitate the production of electrical discharges and allow the effective machining gap spacing to be advantageously enlarged so that an increase in the discharge repetition rate and an enhancement in the removal of machining chips and other products from the gap region may result to promote the stabilized EDM actions and thus to generally improve the EDM process. For the prior art in these particular techniques in which the magnetic field is externally applied in the EDM gap, reference is made to my earlier contributions disclosed in Japanese Patents published under publication No. 29-6942 on Oct. 25, 1954, No. 30-833 on Feb. 11, 1955, No. 30-2943 on Apr. 28, 1955, No. 39-13297 on July 11, 1964, No. 46-11400 on Mar. 23, 1971, No. 46-12520 on Mar. 31, 1971 and No. 54-9759 on Apr. 26, 1979 as well as Japanese Utility Model Registration published under publication No. 31-5790 on Apr. 19, 1956.

In the prior-art proposal, a magnetic-field generating means is provided, e.g. one or more coils energized by an external source of direct-current or alternating-current nature, and is positioned so as to develop a magnetic flux which is constantly fixed to the electrode system with the resulting magnetic lines of force fixedly traversing the confronting surfaces of tool and workpiece electrodes across which machining actions are in progress. The coil may be wound on the tool electrode or workpiece or both, or alternatively an iron core on which an energizable coil is wound may be located in contact with or in the proximity of the tool or workpiece electrode or both to establish the desired stationary magnetic field.

It has now been found that, as pointed out in my aforementioned copending applications, if it is attempted to gain a uniformity of effects achievable by the exertion of a magnetic field over the entire machining zone or a portion thereof of interest, the use of a positionally fixed magnetic flux according to the prior teaching hardly yields the desired results. Thus, the application of a magnetic flux as positionally fixed often causes an undesirable and uncontrolled localization or concentration of electrical discharges, a phenomenon especially noticeable when the workpiece is composed of a ferrous or any other ferromagnetic material. This causes an excessive and irregular wear of the tool electrode as well as an impairment in machining stability and hence a reduction in removal rate.

In my aforementioned patent applications, there is thus provided a method of electrical discharge machining wherein a tool electrode is juxtaposed with a workpiece electrode to form a minute machining gap therebetween in the presence of a machining liquid and a succession of electrical pulses are applied between the tool and workpiece electrodes to produce successive electrical discharges across the machining gap, thereby electroerosively removing material from the workpiece; and wherein as material removal proceeds the tool and workpiece electrodes are advanced relatively towards one another in a predetermined feed direction to form a cavity in the workpiece electrode and wherein a magnetic field is applied to the machining gap over a preselected localized area of juxtaposition between said tool and workpiece electrodes; and the localized magnetic field is successively displaced to sweep over a preselected entire area of juxtaposition between said tool and workpiece electrodes.

There is also provided an electrical discharge machining apparatus wherein a tool electrode is juxtaposed with a workpiece electrode to form a minute gap spacing therebetween in the presence of a machining liquid and a succession of electrical pulses are applied between the tool and workpiece electrodes to produce successive electrical discharges across the machining gap, thereby electroerosively removing material from the workpiece and wherein as material removal proceeds the tool and workpiece electrodes are advanced relatively towards one another in a predetermined feed direction to form a cavity in the workpiece electrode; and wherein there is provided means for applying a magnetic field to the machining gap over a preselected localized area of juxtaposition between said tool and workpiece electrodes; and means for successively displacing the localized magnetic field to sweep it over a preselected area of juxtaposition between said tool and workpiece electrodes.

OBJECTS OF THE INVENTION

It is a principal object of the present invention to provide an improved EDM control method and apparatus wherein the magnetic flux is controlledly applied to the EDM gap region in the manner that an improvement in machining stability, removal rate and the uniformity and a reduction in relative electrode wear can be achieved.

Another object of the invention is to provide a novel and useful EDM control method and apparatus whereby the applicability of the EDM process is expanded.

Another object of the invention is to provide an EDM control method and apparatus which extends the principles set forth in my aforementioned copending applications.

Other objects will become apparent as the following description proceeds.

SUMMARY OF THE INVENTION

In accordance with the present invention, there is provided, in a first aspect thereof, a method of controlling an electrical discharge machining (EDM) process comprising:

(a) supporting a conductive workpiece in spaced juxtaposition with an EDM electrode to define an EDM gap therewith;

(b) relatively displacing the electrode and the workpiece so that the generation of electrical discharges across the gap progressively advances (i.e. deepens) a recess in the workpiece;

(c) feeding an EDM liquid to the gap to remove material erosively removed from the workpiece by the discharges; and (d) applying a succession of machining electrical pulses across the electrode and the workpiece to produce the discharges across the gap, (e) applying a localized magnetic field to the gap in a localized region of juxtaposition of the electrode with the workpiece;

(f) successively displacing the localized magnetic field over further localized regions of justaposition between the electrode and the workpiece, whereby the magnetic field ultimately sweeps over substantially the entire area of such juxtaposition; and (g) controlling at least one parameter of the application and displacement of the magnetic field in response to at least one process parameter of the EDM process.

The invention also provides, in a second aspect thereof, an apparatus for controlling an electrical discharge machining (EDM) process performed with an EDM machine tool comprising:

(a) means for supporting a conductive workpiece in spaced juxtaposition with an EDM electrode to define an EDM gap therewith;

(b) means for relatively displacing the electrode and the workpiece so that the generation of electrical discharges across the gap progressively advances (i.e. deepens) a recess in the workpiece;

(c) means for feeding an EDM liquid to the gap to remove material erosively removed from the workpiece by the discharges;

(d) means for applying a succession of machining electrical pulses across the electrode and the workpiece to produce the discharges across the gap, (e) means for applying a localized magnetic field to the gap in a localized region of juxtaposition of the electrode with the workpiece;

(f) means for successively displacing the localized magnetic field over further localized region of juxtaposition between the electrode and the workpiece, whereby the magnetic field ultimately sweeps over substantially the entire area of such juxtaposition; and (g) means responsive to at least one process parameter of the EDM process for controlling at least one parameter of the application and displacement of the magnetic field.

BRIEF DESCRIPTION OF THE DRAWING

These and other objects, features and advantages of the present invention will become more readily apparent from the following description of preferred embodiments thereof, as taken with reference to the accompanying drawing in which.

SPECIFIC DESCRIPTION

Figure 1:
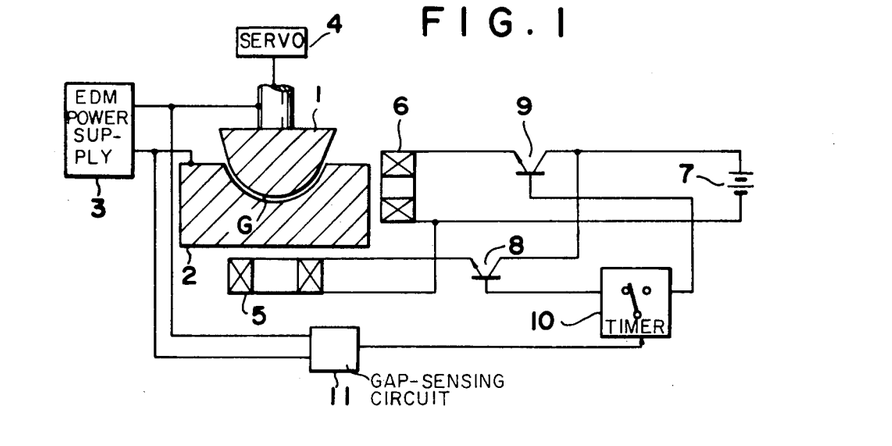
FIG. 1 is a schematic view partly in section and partly in a diagrammatic form illustrating an embodiment of the invention in which two or more coil means are fixedly arranged at preselected spaced-apart locations about the EDM gap zone and energized in sequence to produce successively displaced magnetic fluxes.

Referring now to FIG. 1, a typical EDM system comprises a tool electrode 1 juxtaposed with a workpiece electrode 2 to form a machining gap G therebetween, the gap being filled with an EDM liquid, e.g. kerosene, transformer oil or distilled water supplied continuously or pulsively from a nozzle or any other supply unit (not shown). An EDM power supply 3 is connected across the tool electrode 1 and the workpiece electrode 2 to apply a series of machining pulses between them to produce across the gap G a succession of electrical discharges which electroerosively remove material from the workpiece electrode 2. An electrode drive or servo feed unit 4 is shown associated with the tool electrode 1 to effect the relative advance movement of the tool 1 towards the workpiece 2 required to maintain the size of the machining gap G substantially constant as the material removal from the workpiece 2 proceeds. The servo unit 4 is also responsive to a gap short-circuiting condition or excessively low resistance or impedance condition which may occur in the machining gap G from time to time. In accordance with the customary EDM practice, the system may also be provided with an electrode reciprocating unit included in the electrode drive unit 4 and associated with the movable electrode 1 to periodically retract the electrode 1 away from the workpiece 2, thereby promoting the gap flushing or chip removal in the region of the machining gap G.

In accordance with the present invention, a plurality of magnetic-field generators, here shown by two coils 5 and 6, are provided proximate to the region of the machining gap G to successively produce magnetic fields oriented in different directions. The coils 5 and 6, here shown arranged in a region which surrounds the workpiece electrode 2 being machined by the tool electrode 1, are connected in parallel to a common power supply 7 via switches 8 and 9, respectively, which are controlled by a control switching timer 10. The switching timer 10 is any known timer, such as an astable or bistable multivibrator device, which alternately provides first and second output pulses which are applied to the switches 8 and 9, respectively. When the switch 8 is energized with the first output pulse of the timer 10, the coil 5 is energized by the power supply 7 to produce a magnetic field oriented in a first direction, here in the vertical or machining-feed direction in which the tool electrode 1 is advanced by the servo-feed unit 4 to penetrate into the workpiece electrode 1. When the switch 9 is energized with the second output pulse of the timer 10, the coil 6 is energized by the power supply 7 to produce a magnetic field oriented in a second direction, here in a horizontal direction orthogonal to the machining-feed direction. The resulting magnetic fluxes oriented in the mutually orthogonal directions are applied successively to the region of the machining gap G.

Magnetic fields successively generated and applied to the gap G region selectively in the varying directions should each be of a field strength or intensity such as to produce a magnetic flux density ranging generally between 100 and 5000 Gauss and, preferably, not less than 200 Gauss. As has been recognized, each resulting magnetic flux in succession, when so adjusted, has such a strong interaction with the discharge current in the gap G applied between the tool electrode 1 and the workpiece electrode 2 in the form of successive time-spaced pulses as to lead the machining action to favorable results. Thus, a favorable gap condition is created which facilitates gap breakdown and sparkover by an individual discrete machining pulse so that successive pulses have a uniform discharge characteristic while permitting the effective spark-over distance of the machining gap G to be increased, phenomena attributable to the magnetic tendency of magnetically susceptible particles present in the machining gap G and the electromagnetic force acting on the discharge current.

In the system of FIG. 1, thus, the magnetic fields oriented in the vertical and horizontal directions are alternately produced to alternately apply the corresponding fluxes to the region of machining gap G when the two coils 5 and 6 are alternately energized with the two switches 8 and 9 alternately turned on. The rate of alternation or switching should generally range between 0.1 and 100 Hz. No higher rate is required or satisfactory. By periodically changing the direction in which the magnetic flux is applied to the region of machining gap G, there appears to develop a random agitation of magnetic particle suspensions in the gap G which tend to concentrate under a static magnetic field. Experimentation has shown that the localized development of electrical discharges which is often the case with a static magnetic field is effectively avoided while the advantageous effect by the magnetic field to substantially increase the effective gap spacing is retained which promotes chip removal from the machining gap G region. Thus, a highly stable and satisfactory machining operation results which permits an increased removal rate and a better surface quality, hence a substantially improved machining efficiency. As will be described hereinafter in greater detail, a sensing/control circuit 11 is provided and associated with the timer 10 for controlling the switching of the location of a localized magnetic field from one position to another in response to a parameter, e.g. gap voltage, of the EDM process.

Figure 2:
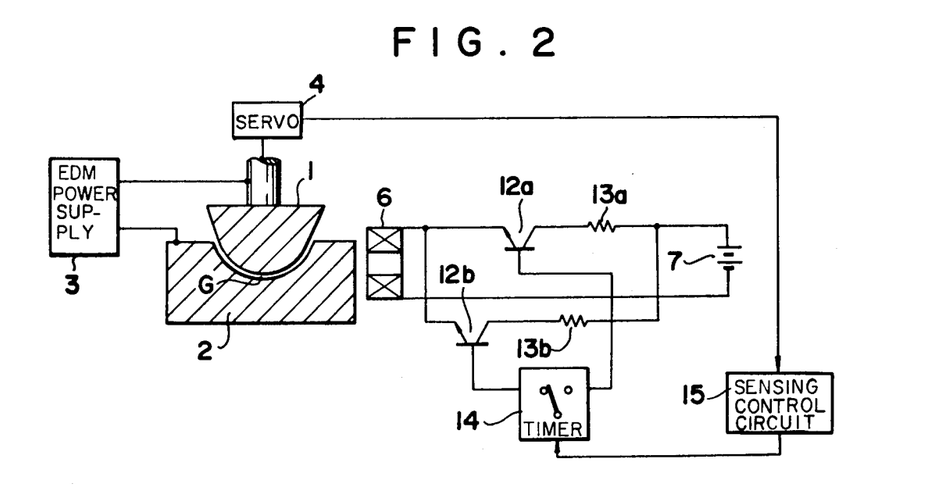
FIG. 2 is a schematic view illustrating a modification of the embodiment of FIG. 1 in which the energizing current for each coil is varied.

In a system shown in FIG. 2, the energization current applied to one or both of the coils 5 and 6 is varied in intensity to change the strength of the localized magnetic field with time. As shown, the coil 6 is connected to the power supply 7 via a pair of parallel circuits including serial connections of a switch 12a and a resistor 13a; and a switch 12b and a resistor 13b, respectively; the switches 12a and 12b are energizable by a switching timer 14 which may again be an astable or bistable multivibrator device. The resistors 13a and 13b variably set the resistance in the corresponding connection circuits at different values so that as the switches 12a and 12b are alternately turned on by the timer 14, different energizing currents develop in sequence through the coil 6 to develop magnetic fields of different field strengths in sequence. As will be described in greater details hereinafter, a sensing/control circuit 15 is here again provided and associated with the timer 14 for controlling the strength of the magnetic field in response to a process parameter of the EDM process. The circuit 15 may respond to an electrode retraction signal furnished to the electrode drive unit 4 for each cycle of the electrode reciprocation movement so that the field strength becomes greater when the electrode 1 is retracted to sustain machining discharges.

Figure 3:
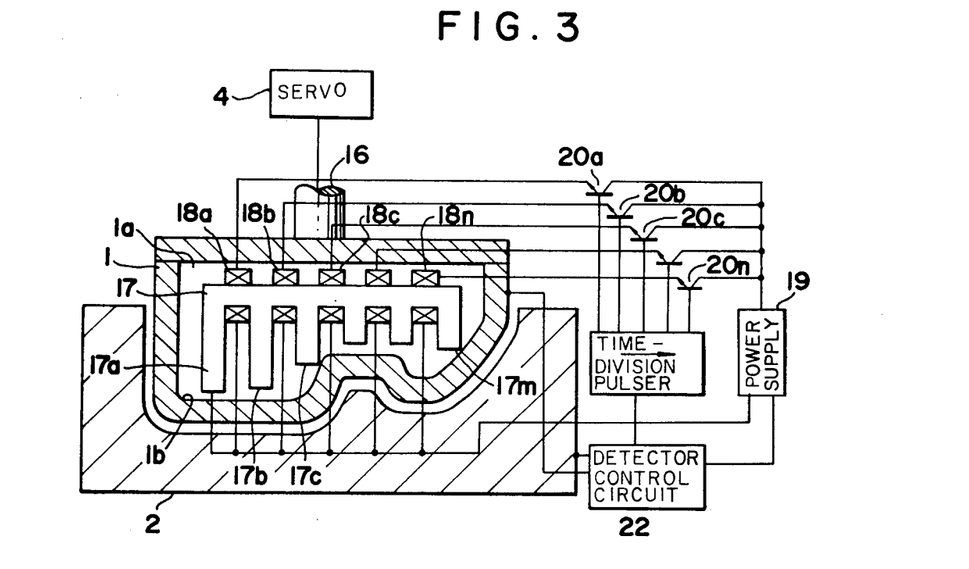
FIG. 3 is a schematic view partly in section and partly in a block form diagrammatically illustrating an embodiment of the invention in which a plurality of magnetic poles are arranged in a distributed manner in an EDM electrode and activated successively to produce a successively displaced localized magnetic field and to switch the field location from one position to the next in response to a gap signal.

FIG. 3 shows a further embodiment of the present invention in which the tool electrode 1 composed of copper, brass, graphite or any other non-magnetic or weakly magnetic material and formed with a machining surface by pressing, cutting or electroforming is provided with an internal chamber 1a having magnetic-field generating means arranged therein. The tool electrode 1 is carried by a spindle 16 whose vertical movement is controlled by the electrode drive or servo unit 4 as previously shown and to maintain the length of the machining gap G substantially constant as machining proceeds. In this and certain other FIGURES that follow, the machining power supply as well as the machining liquid supply is omitted from illustration. The workpiexe 2 is of a ferrous material which is magnetically permeable.

The magnetic-field generating means here comprises a core member 17 and a plurality of coils 18a, 18b, 18c, ... and 18n wound thereon and energized by a common DC power supply 19 via parallel switching circuits 20a, 20b, 20c ... and 20n, respectively, the switches in these circuits 20a, 20b, 20c, ... and 20n being controlled by a control pulser 21. The core member 17 has a plurality of closely spaced projections 17a, 17b, 17c, ... and 17m which serve as divided magnetic pole pieces and which conform in their individual lengths substantially to the shape of the inner face 1b of the hollow tool electrode 1 and thus generally to the shape to be reproduced in the workpiece 2. The coils 18a, 18b, 18c, ... and 18n are wound on the core member 17 so that the adjacent projections 17a and 17b, 17b and 17c, ... and 17m constitute the two opposite N and S poles. The switching control circuit 21 is basically a time-division pulser adapted to furnish a repetition of the required set of output pulses in sequence to be applied respectively to the switches 20a, 20b, 20c ... and 20n and may be a ring-counter device of well known configuration.

In operation, the control circuit 21 may turn on and off the switches 20a, 20b, 20c, ..., and 20n in sequence to energize the coils 18a, 18b, ..., and 18n successively. Each coil, when energized, magnetically excites the adjacent two projections or poles and creates a localized magnetic flux which emanates from one of the projections (north pole) and returns to the other (south pole) after traversing the adjacent gap zone forth and back along a U-shaped path including the workpiece 2. As the successive switching advances, a progressive displacement of this localized magnetic flux over the entire gap region of interest is effected. In this connection, any desired displacement pattern can be obtained by determining the order of energization of coils 18a, 18b, 18c, ..., and 18n accordingly. The core member 17 naturally may not be an integral body but may be divided into separate pieces so that each piece individually carries the two magnetic pole projections and is individually wound by one exciting coil.

A highly stable EDM operation is achieved by establishing a localized magnetic field and successively displacing the field over the entire machining region. The magnetic field which is locally set up should be sufficient to produce a magnetic flux density ranging between 100 and 5000 Gauss. As has been noted, the magnetic field when created at the machining gap externally supplied with successive machining pulses facilitates sparkover and gap breakdown for each pulse and serves to increase the effective machining gap spacing. The successive displacement of a locally produced magnetic field allows uniform development of successive electrical discharges over the entire machining region; practically no discharge concentration occurs. This appears to be due to a dynamic fluctuation and agitation of magnetic chip particles, decomposed gases and ions in the machining gap G created under the moving field, which also permits this gap detritus to be promptly carried away from the machining region. In general, in EDM the rate of decomposition of the machining liquid is determinative of the machining speed. Here, since the rate of detritus removal from the gap region is enhanced and the rate of decomposition of the machining liquid is accelerated by discharge stabilization, an increase in machining speed up to 30% readily results.

By setting up a localized magnetic field and successively displacing the field over the entire machining area, machining is permitted to occur with an effectively increased gap spacing and with stability. Since the increase in the gap spacing is precisely controllable as a function of the field strength of the localized magnetic field, a single tool electrode can be used to perform both rough and finish operations. Further, any machined cavity with a local enlargement can be achieved.

The field strength of each local magnetic field is readily controlled to suit to a desired mode of machining by controlling the energization current for each exciting coil 18a, 18b, 18c, ..., 18n.

It should also be noted that a change in gap conditions may make it desirable to change the energization and displacement parameters of the localized magnetic field. To this end, a gap detector/control unit 22 is connected to the tool electrode 1 and the workpiece electrode 2 to provide a control signal which acts on the power supply 19 and/or the ring counter 21. When the former is acted upon, the field strength of the magnetic field is controlled. When the latter is acted upon, the rate of displacement of the localized magnetic field is controlled.

It has been found that it is extremely advantageous to constitute the switching control circuit 21 for switches 20a, 20b, 20c ... and 20n as a latch signal generator operable by an input signal fed by the detector/control circuit 22.

With a localized magnetic field applied to a localized region of juxtaposition between the tool electrode 1 and the workpiece 2, that region becomes easier to produce repeated electrical discharges so that an arc discharge may tend to develop. When an arc discharge takes place or tends to take place, a drop in the gap voltage between the tool electrode 1 and the workpiece 2 occurs and is detected by the control unit 22. The control unit 22 includes a threshold circuit, e.g. a Schmitt-trigger circuit, which, when its preset threshold level is traversed by the gap voltage, produces an output signal and furnishes it to the latch signal generator 21. Each time such a signal is received, the generator 21 is enabled to turn its conducting signal to one of the switches 20a, 20b, 20c ... and 20n. For example, assume that the switch 20a is now conducting to energize the coil 18a and thus to develop the localized magnetic field through the pole pieces 17a and 17b to the adjacent area of the gap. When an arc discharge then tends to develop at that area, the detector/control circuit 22 instantaneously responds to this development and furnishes its output signal to the generator 21 so that the switch 20a is turned off and the switch 20b is turned on and consequentially the coil 18a is deenergized and the coil 18b is energized to shift the area of the localized magnetic field. The shifted localization of the magnetic field is maintained until an arcing condition develops at the shifted area. When this development is detected, the detector/control circuit 22 operates the generator 21 to turn the switch 20b off and the switch 20c on to establish a new area of the localized magnetic field by the coil 18c. In this manner, the localized magnetic field is successively displaced while switching from one position to another in response to the development of arcing condition to ultimately sweep over the entire area of the workpiece 2 being erosively machined.

This form of controlled application of the localized magnetic field is particularly advantageous to enhance the removal rate to an ultimate limit on account of the fact that each localized flux and hence each localized area of machining discharges is held up to an extreme extent. Yet a damaging arc condition is effectively eliminated. In reality, no discharge concentration ensues. Discharge spots are shifted over the entire area of the workpiece with maximum effectiveness. The dynamic fluctuation and agitation of magnetic chip particles, decomposed gases and ions in the machining gap created under the sweeping magnetic field allows them to be carried away from the discharge sites with maximum efficiency.

Figure 4:
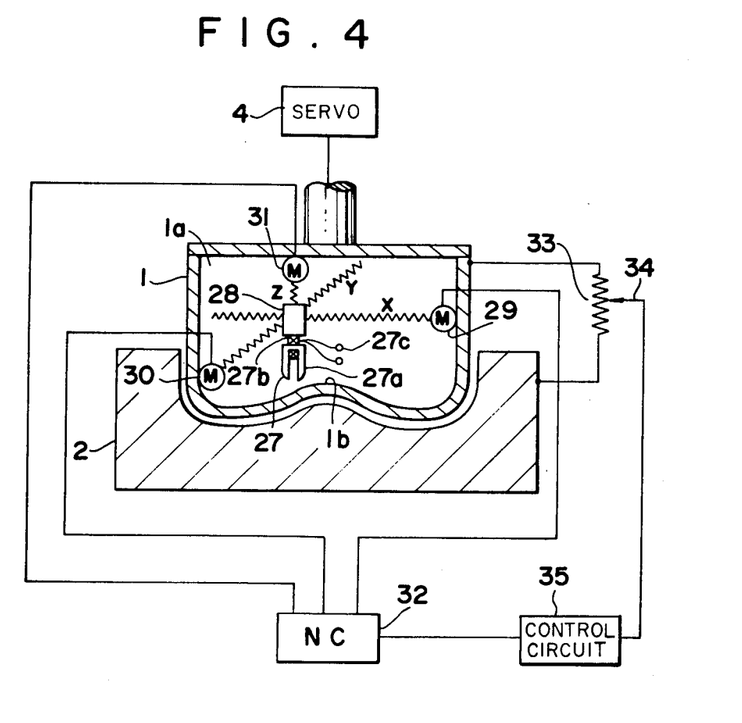
FIG. 4 is a schematic view partly in section and partly in a diagrammatic form illustrating an embodiment of the invention in which the tool electrode accommodates in its interiorly formed chamber a magnetic head movable along three axes to produce a successively displaced localized magnetic field.

In the embodiment shown in FIG. 4, the moving magnetic field is produced by a magnetic head 27 carried by a support 28 displaceable along an X-axis, Y-axis and Z-axis by means of motors 29, 30 and 31, respectively, within the electrode chamber 1a. During the course of an EDM operation, the motors 29, 30 and 31 are driven in accordance with control drive signals in the form of drive pulses furnished by an externally provided numerical controller 32 to displace the magnetic head 27 along the rear (i.e. internal) face 1b of the machining electrode, thereby successively displacing the local magnetic field generated by the magnetic head 27. A gap sensing resistor 33 is connected across the tool electrode 1 and the workpiece 2 to develop a signal proportional to the gap voltage. A sensing slider 34 on the resistor 33 is connected to a control circuit 35 which feeds into the NC controller 32. Only when the tendency towards arcing condition in the gap is detected by the sensing unit 33, 34, is the control circuit operated to enable the NC controller 32 to feed each incremental drive pulse or each series of incremental drive pulses to the motors 29, 30 and 31 to switch the region of the localized magnetic field from one given position to another to controlledly displace the localized magnetic field in essentially the same manner as described above.

Figure 5A:
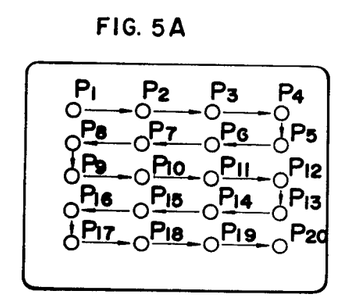
FIGS. 5(A), 5(B) and 5(C) are diagrammatic views illustrating exemplary manners which the magnetic poles of the system of FIG. 3 may be sequentially produced or the magnetic head of FIG. 4 may be sequentially moved to produce a successively displaced localized magnetic field.
Figure 5B:
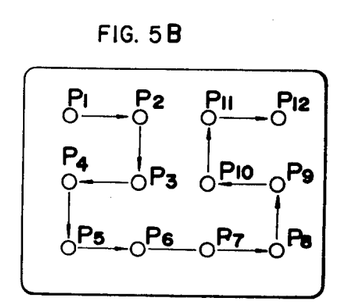
Figure 5C:
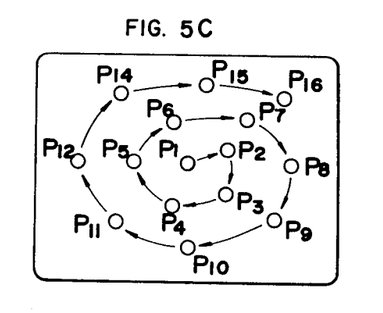

FIGS. 5A–5C show typical ways in which magnetic poles $P_1$, $P_2$, $P_3$ . . . may be arranged and successively activated or moved with the systems FIGS. 3 and 4.

Each localized magnetic field is, as mentioned previously, such as to give a flux density in the range between 100 and 5000 Gauss. By establishing a localized magnetic field and displacing it successively, uniform development of machining discharges over the entire gap area is ensured. When the displacement of the localized magnetic field is effected at an increased speed, say, of 1 to 100 m/sec there will be produced a displacement of the discharge column within a single applied machining pulse so that the resulting elongation of the discharge crater on the workpiece surface yields an improved surface finish.

Figure 6:
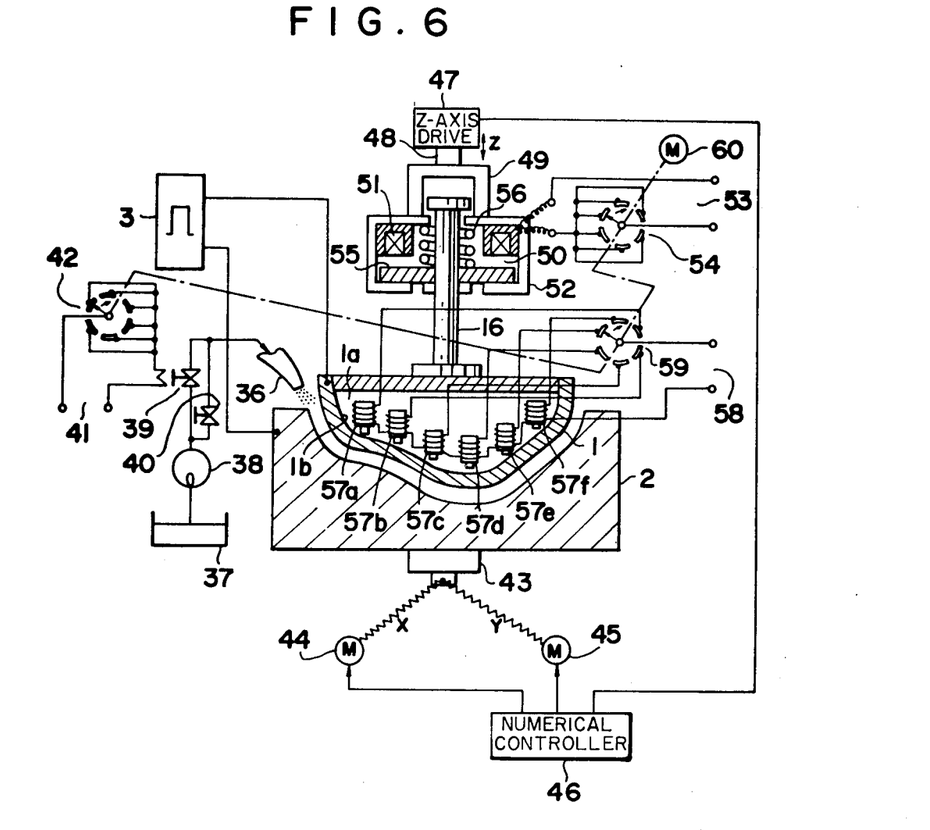
FIG. 6 is a schematic view partly in section and partly in a diagrammatic form illustrating another embodiment of the invention using a plurality of electromagnets disposed within an EDM electrode and selectively activated when the electrode is retracted in each cycle of its reciprocation movement conducted in an EDM process.

FIG. 6 shows an EDM control system in which the tool electrode 1 is reciprocated, during a course of EDM operation, periodically to move away from and towards the workpiece 2 to facilitate the removal of gap contaminants and the localized magnetic field is applied selectively when the tool electrode is retracted in each cycle of the reciprocation movement to sustain machining discharges. In a prior art EDM operation using the electrode reciprocation technique which retracts the tool electrode at least once in a second, one half to one third of the total machining time is elapsed without causing machining discharges. This disadvantage of the prior art with the electrode reciprocation technique is effectively eliminated according to the system of FIG. 6.

In the system of FIG. 6, the tool electrode 1 carried by the spindle 16 is again shown spacedly juxtaposed with the workpiece 2. An EDM power supply 3 is connected to the tool electrode 1 and the workpiece 2 to apply a succession of machining pulses across the EDM gap formed therebetween and flushed with an EDM liquid medium supplied from a nozzle 36. The EDM liquid is delivered from a reservoir 37 by a pump 38. An electromagnetic valve 39 is provided in the fluid conduit between the pump 38 and the nozzle 36 and is bypassed by a relief valve 40. The solenoid for the electromagnetic valve 39 is energized by a power source 41 via a rotary switch 42.

The workpiece 2 is shown carried by a worktable 43 which is moved in an X-Y plane by an X-axis motor 44 and a Y-axix motor 45 which are driven by drive pulses furnished from a numerical controller 46. The latter has data for a desired displacement of the workpiece 2 preprogrammed therein and, in operation, such data is reproduced in sequences of drive pulses which are furnished to the motors 44 and 45 to displace the workpiece 2 along the desired path in the X-Y coordinate system relative to the tool electrode 1.

The machining feed displacement of the tool electrode 1 along the Z-axis is effected by a Z-axis drive motor unit 47 which moves a shaft 48 in the direction of the Z-axis. The shaft 48 is secured to a U-shaped member 49 terminating at a tool reciprocation assembly 50 and coupled to the spindle 16. The Z-axis drive motor unit 47 is fed with drive pulses of the Z-axis displacement component from the numerical controller 46 to move the tool electrode 1 towards and into the workpiece 2. With the motors 44, 45 and 47 driven under the control of the NC unit 46, a machining recess is formed in the workpiece 2 and progressively advanced until it reaches a desired machining extent.

The tool reciprocation unit 50 comprises a coil 51 accommodated in a cylindrical housing 52 and energized by a DC power source 53 via a rotary switch 54. A magnetically permeable disk plate 55 secured to the spindle 16 is received in the housing 52 and electromagnetically attracted to the coil 51 to lift the spindle 16 and the tool electrode 1 each time the coil 51 is energized. A helical spring 56 is disposed to bridge the space between the upper wall of the housing 52 and the disk plate 55 to normally force the latter away from the coil 51 and the tool electrode 1 downwards. The intermittent energization of the coil 51 therefore results in the reciprocation of the tool electrode 1 or intermittent retraction thereof away from the workpiece 2 along the Z-axis.

The tool electrode 1 contains a plurality of electromagnets 57a, 57b, 57c, 57d, 57e and 57f in its internal cavity 1a. These electromagnets are individually positioned to sit along the rear face 1b of the tool electrode 1 and are successively energized by a DC source 58 via a rotary switch 59 to apply a localized magnetic field moving successively along the machining gap as previously described.

The rotary switches 42, 54 and 59 have their own single rotary elements and plural stator elements which are spaced apart from one another. The number of the stator elements of the rotary switch 59 corresponds to the number of the electromagnets 57a, 57b . . . and 57f. The stator elements of the rotary switch 42 should be equal in number to those of the rotary switch 54. A motor 60 is provided to simultaneously rotate the rotary elements of the rotary switches 54, 59 and 42 and, in rotation, to bring their own single rotary elements into contact with respective ones of their own plural stator elements simultaneously. The rotary switch 54 has its rotary element connected to one terminal of the power supply 53 and its stator elements individually connected to the other terminal of the power supply 53 via the coil 51. As the rotary element in the switch 54 rotates, the coil 51 is periodically energized to periodically retract the tool electrode 1 away from the workpiece. The rotary switch 42 has its rotary element connected to one terminal of the DC source 41 and its stator elements individually connected to the other terminal of the DC source 41 via the solenoid of the electromagnetic valve 39. As the rotary element in the switch 42 rotates, the valve 39 is periodically opened to periodically increase the amount of the EDM liquid supplied to the EDM gap. Due to the ganged arrangement of the switches 54 and 42, the retraction of the tool electrode 1 away from the workpiece 2 and the increase in the amount of supply of the EDM liquid to the EDM gap are synchronized with one another.

The rotary switch 59 on the other hand has its rotary element connected to one terminal of the DC supply 58 and its stator elements connected to the other terminal of the DC supply 58 individually via the coils of electromagnets 57a, 57b, 57c . . . and 57f, respectively. As the rotary element in the switch 59 rotates, the electromagnets 57a, 57b, 57c . . . and 57f are successively energized to provide a localized magnetic field successively to their respective adjacent regions in the EDM gap. Due to the ganged arrangement of the rotary switches 54 and 59, the application of the localized magnetic field is selectively effected for a period in which the tool electrode 1 is retracted away from the workpiece 2.

The increase in the gap spacing achieved by the retraction of the tool electrode 1 away from the workpiece 2 creates a favorable condition whereby to facilitate the removal of gap contaminants, e.g. machining chips, tars and gases. This condition is, however, accompanied in the conventional practice by a difficulty in sustaining machining discharges due to an increased distance across which to bridge a spark. This difficulty is eliminated in the system of FIG. 6 in which the magnetic field is selectively applied or increased in intensity to effectively increase the sparkover distance so that machining discharges are enabled to occur even during the retraction of the tool electrode and thus are continuously produced over the entire machining period while retaining the benefit of enhanced gap decontamination with the tool reciprocation arrangement. Furthermore, the system of FIG. 6 makes successive transfer of discharge sites with the successively displaced localized magnetic field which effectively deconcentrates discharges and removes damaging arcing conditions. The intermittent flushing of the EDM liquid or augmentation of the amount thereof should preferably be conducted synchronously with the selective application or augmentation of the localized magnetic field to achieve an increased effect of washing the gap comtaminants. In this connection, a plurality of such nozzles 36 may be arranged to surround the machining gap or one or more such nozzles may be oriented to selectively direct the EDM liquid to a localized region of the EDM gap to which the localized magnetic field is applied in each cycle of successive magnetization steps as has been described.

A test has been conducted to prove the effectiveness of the system of FIG. 6, using a copper electrode in machining a ferrous workpiece. The tool electrode had a planar machining surface with an area of 50 cm$^2$ and contained electromagnet units spaced apart with a spacing of 15 mm. Each of the electromagnets was energized to develop a magnetic field of a strength of 55 Gauss when the tool electrode is in a closest approach to a workpiece and to develop the magnetic field of a strength of 1100 Gauss when the tool electrode is removed away from the workpiece. EDM pulse had a duration $\tau$on of 10 microseconds, an interval $\tau$of of 4 microseconds and a peak current Ip of 40 amperes, a machining condition set to yield a surface roughness of 20 μRmax. The tool reciprocation was effected at a frequency of 1 Hz and with a stroke of 0.08 mm. The electromagnets were successively energized in synchronism with the tool reciprocation. In this manner, it took only 33 hours for reaching a machining depth of 50 mm in the workpiece. In comparison, the conventional form of EDM with the tool reciprocation but without the magnetic field requires a machining time as long as 78 hours. Generally, it has been found that with the present invention, the removal rate is increased to two or three times that with the conventional method.

Figure 7:
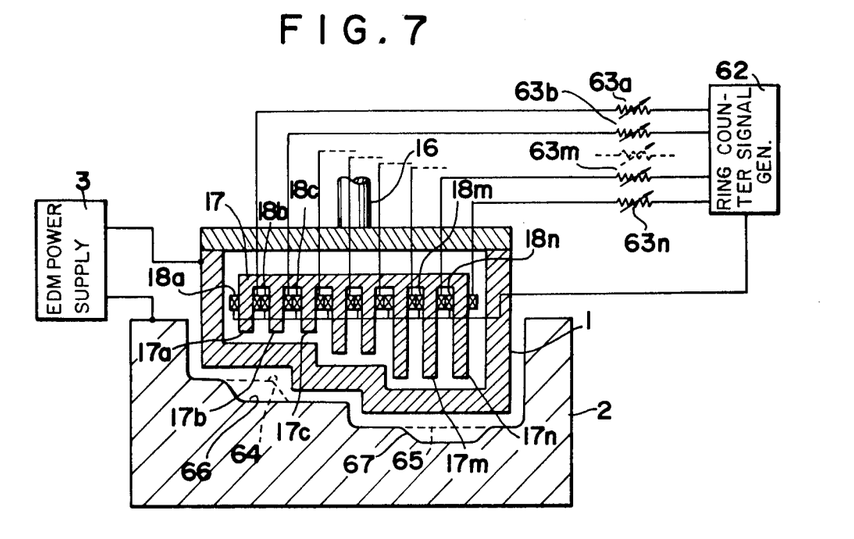
FIG. 7 is a schematic view partly in section and partly in a block form illustrating another embodiment of the invention using a plurality of magnet poles disposed within an EDM electrode and selectively activated to produce a successively displaced magnetic field of an intensity which locally varies to achieve a desired machining pattern or accuracy.

FIG. 7 shows another embodiment of the invention for controlling the localized magnetic field in response to a parameter of a desired EDM process. This embodiment is shown including a field generator generally similar to that shown in FIG. 3 and makes use of a plurality of coils 18a, 18b, 18c . . . 18m and 18n wound on pole pieces 17a, 17b, 17c . . . 17m and 17n, respectively, which project from a common base core member 17. Here again, pole pieces 17a, 17b, 17c . . . 17m and 17n have their individual lengths of projection terminating rear a surface similar to the machining surface of the tool electrode 1. A ring-type generator 62 is connected to the coils 18a, 18b . . . 18m and 18n via variable resistors 63a, 63b . . . 63m and 63n, respectively, to successively energize them, thereby successively producing a localized magnetic field at the localized regions in the gap adjacent to the tips of the pole pieces 17a, 17b . . . 17m and 17n, respectively. The tool electrode 1 is here again shown carried by a spindle 16 and moved downwards as a recess is progressively formed in the workpiece 2 by electroerosive pulses applied across the machining gap from the EDM power supply 3.

The system shown in FIG. 7 is designed to control the shape of the recess formed in the workpiece 2 by locally varying the strength of the magnetic field. Under a constant localized magnetic field uniformly produced by the pole pieces 17a, 17b . . . 17m and 17n, the EDM recess will assume a machined contour shown by a broken line 64 below the pole pieces 17a and 17b and a broken line 65 below the pole pieces 17m and 17n. It has been found that this machined contour can controlledly be varied by controlledly varying the intensities of the localized magnetic fields; the contours 64 and 65 can be shifted to 66 and 67 shown by solid lines by selectively increasing the strength of the magnetic fields provided through the pole pieces 17a and 17b; and 17m and 17n, respectively. Thus, the values of the resistors 63a, 63b . . . 63m and 63n determining the intensities of the energizing currents for the coils 18a, 18b . . . 18m and 18n can individually be set to establish the strengths of the magnetic fields in accordance with desired local shifts of the contour of the recess in the workpiece 2.

Figure 8:
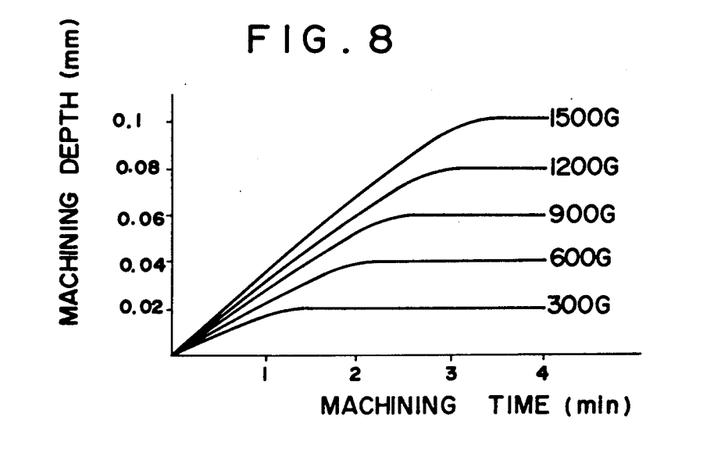
FIG. 8 is a graph illustrating the relationship between the machining time in minutes and machining depth in mm as the intensity of the magnetic field is varied.

FIG. 8 is graph showing the relationship between the machining depth in term of mm and the machining time in term of minutes observed in an EDM process performed between a tool electrode and a workpiece which are held stationary and when the magnetic field is applied with different strengths ranging between 300 and 1500 Gauss. It is seen that with a field strength of 300 Gauss, machining reaches a depth of 0.02 mm in 1 minute and then stops. With a field strength of 600 Gauss this maximum depth increases to 0.04 mm. With a field strength of 1500 Gauss, the maximum depth is as large as 0.1 mm. It can therefore be seen that the extent of machining in each localized area in a given time can be controlled by controlling the strength of the localized magnetic field. In the example of FIG. 8, the EDM gap had an effective sparkover distance of 12 μm in the absence of a magnetic field. The graph shows that under the magnetic field of a strength of 300 Gauss, the sparkover distance is increased to 20 μm. With a field strength of 1500 Gauss, the distance is increased to 100 μm. If a tool electrode has three distinct regions placed under localized magnetic fields of 0, 300 and 1500 Gauss, an EDM recess machined therewith in a workpiece will have a contour which is equal to an imaginary envelope surface obtained by shifting the actual electrode surface contour by these distances at those respective regions. Thus, in general, it is possible to achieve with a given electrode an EDM recess with a deviation in shape which can be controlled as desired and with a due machining precision.

Figure 9:
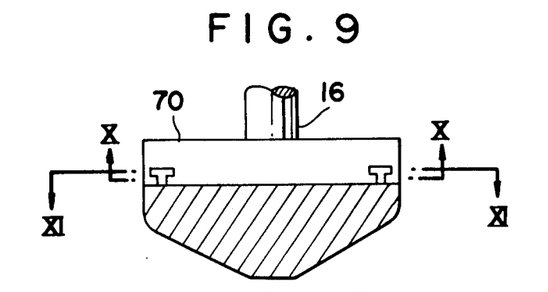
FIG. 9 is an elevational sectional view diagrammatically illustrating a magnetic retainer plate secured to a spindle and actuated to retain an EDM electrode in a further arrangement embodying the present invention.
Figure 10:
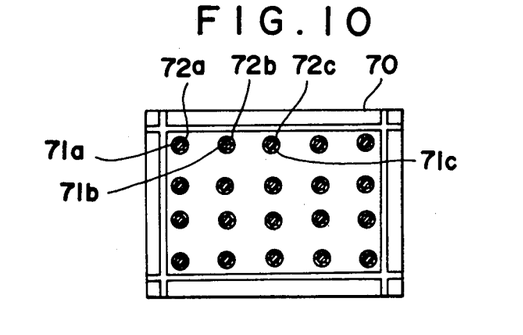
FIG. 10 is a plan view of the magnetic retainer plate as taken along the line X—X and viewed from below in FIG. 9.
Figure 11:
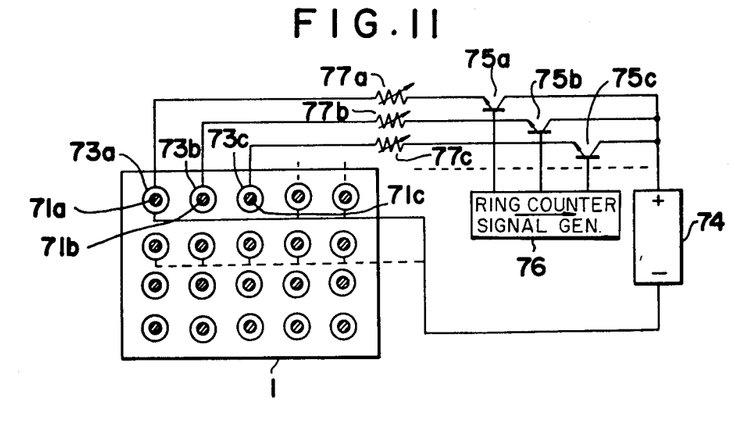
FIG. 11 is a plan view of the magnetic retainer plate as taken along the line XI—XI and viewed from above in FIG. 9, also illustrating a power supply for energizing the retainer and producing a successively displaced localized magnetic field according to the invention.

FIG. 9 shows a magnetic retainer plate unit 70 secured to a tool spindle 16 to electromagnetically retain and thereby support an EDM tool electrode in machining relationship with a workpiece and designed also to exerting localized magnetic fields on sequential regions in the gap, respectively. As shown in FIG. 10, the retainer plate unit 70 has a multiplicity of pole pieces 71a, 71b, 71c . . . uniformly distributed over the entire area thereof so as to individually sit in the direction of its thickness and to come in contact with the tool electrode 1 to electromagnetically attract the latter. As shown, each of the pole pieces 71a, 71b, 71c . . . is sheathed in a tubular magnetically nonpermeable material 72a, 72b, 72c . . . to avoid their mutual magnetic interaction. As shown in FIG. 11, the pieces 71a, 71b, 71c . . . have their individual coils 73a, 73b, 73c . . . wound thereon energized by a DC supply 74 via switches 75a, 75b, 75c . . . , respectively. The switches 75a, 75b, 75a . . . in a predetermined order of sequence are turned on and off successively, by a ring-contour switching control circuit 76 in such a manner that when one of the switches is rendered nonconductive following a predetermined period of conduction, another is rendered conductive and held in conduction for the same conductive duration. The result is the successive energization of the coils 73a, 73b, 73c . . . , each of which as energized produces through its own pole piece 71a, 71b, 71c . . . a localized magnetic field traversing its adjacent localized region of the gap and at the same time serving to electromagnetically retain the tool electrode 1. Since the coils 73a, 73b, 73c . . . are successively energized in the predetermined sequence, there results displacement of the localized magnetic field along a path determined by their positions and sequence of energization. There is no time in which none of the pieces 71a, 71b, 71c . . . is magnetized; accordingly the plate 70 continuosly to electromagnetically attracts and thereby retains the tool electrode 1. The rate of displacement of the localized magnetic field along the prescribed path can be set at a desired value by controlling the rate of switching in the ring-counter signal generator 76. Variable resistors 77a, 77b, 77c . . . may be inserted in the respective branches of the switches 75a, 75b, 75c . . . and may be adjusted to adjustably set the intensity of each localized magnetic field and to locally vary the field intensities as desired.

Figure 12:
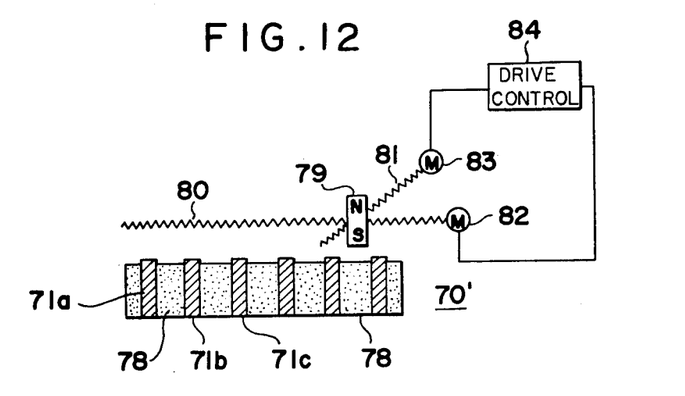
FIG. 12 is a schematic view partly in section and partly diagrammatic illustrating a modified magnetic retainer for embodying the present invention.

FIG. 12 shows a modification of the embodiment of FIG. 11 in which a modified magnetic retainer plate unit 70′ comprises a multiplicity of pole pieces 71a, 71b, 71c . . . embedded in a magnetically nonpermeable plate material 78 and having their individual lower end faces adapted to contact with the tool electrode (not shown). In this embodiment, a permanent magnet or electromagnet head 79 is provided to move along a path in the proximity of the upper end faces of the pole pieces 71a, 71b, 71c . . . The magnetic head 79 is carried on a crossfeed arrangement movable on an X-axis feed screw 80 and a Y-axis feed screw 81 driven by an X-axis motor (e.g. pulse motor) 82 and a Y-axis motor (e.g. pulse motor) 83, respectively. A drive control unit 84 is provided to furnish the motors 82 and 83 with drive signals to move the magnetic head 79 to cause it to traverse the upper faces of the pole pieces 71a, 71b, 71c . . . in a predetermined order of sequence. Each pole piece 71a, 71b, 71c . . . disposed beneath the moving magnetic head 79 is subjected to a localized magnetic field which field is communicated to the adjacent region in the EDM gap as previously described. Thus, the ultimate result is here again the sweeping of the localized magnetic field over the entire area of the machining gap.

What is claimed is:

1. A method of electrical discharge machining wherein a tool electrode is juxtaposed with a workpiece electrode to form a machining gap therebetween in the presence of a machining liquid and a succession of electrical pulses are applied between the tool and workpiece electrodes to produce successive electrical discharges across the machining gap, thereby electroerosively removing material from the workpiece and wherein as material removal proceeds the tool and workpiece electrodes are advanced relatively towards one another in a predetermined feed direction to form a cavity in the workpiece, the method including the steps of:
producing a localized magnetic field so that it is concentrated at least predominantly on a region of said machining gap which constitutes only a limited portion of a preselected entire area of juxtaposition between said tool and workpiece electrodes;
successively shifting said region of concentration of said magnetic field to sweep it over said entire area of juxtaposition between said tool and workpiece electrodes, and
controlling at least one parameter of the production and sweeping of said magnetic field in response to at least one process parameter of said EDM process.

2. The method defined in claim 1 wherein said localized magnetic field is of a field strength in the range between 100 and 500 Gauss.

3. The method defined in claim 2 wherein said field strength is in excess of 200 Gauss.

4. The method defined in claim 2 wherein said localized magnetic field is produced so as to be concentrated successively on a preselected number of such regions and switched from the such region to another at a switching rate of 0.1 to 100 Hz.

5. The method defined in claim 2 wherein said localized magnetic field is swept at a speed of 1 to 100 m/sec.

6. The method defined in claim 1 wherein a plurality of electromagnetic coil means are disposed within said electrode, each of said coil means being selectively energizable to provide said localized magnetic field and said coil means being energized in a predetermined sequence to sweep said localized magnetic field along a predetermined path.

7. The method defined in claim 6 wherein said plural electromagnetic coil means are arranged in an array which encompasses said area of juxtaposition between said tool electrode and said workpiece.

8. The method defined in claim 1 wherein said localized magnetic field is produced by a magnetic head disposed within said electrode and is swept along a predetermined path of travel by displacing said magnetic head along a predetermined path within said electrode.

9. The method defined in claim 1 wherein said parameter of the EDM process is a gap signal derived from said EDM gap indicating that an arcing condition tends to develop in said EDM gap.

10. The method defined in claim 1 or 9 wherein said parameter of said localized magnetic field is the timing of sweeping thereof from one of such localized regions to another.

11. The method defined in claim 1 wherein said parameter of said localized magnetic field is the strength thereof.

12. The method defined in claim 11 wherein said tool electrode is intermittently retracted away from said workpiece and said at least one parameter of the EDM process is a signal for effecting said retraction of the tool electrode in each electrode reciprocation cycle whereby said localized magnetic field is increased in strength selectively during a time period in which said electrode is retracted.

13. The method defined in claim 2 wherein the strength of said localized magnetic field is decreased substantially to zero when said tool electrode is removed back to a normal position in each electrode reciprocation cycle.

14. The method defined in claim 12 or claim 13 further comprising the step of increasing the amount of flow of said EDM liquid into said EDM gap selectively during the time period in which the intensity of said localized magnetic field is increased.

15. The method defined in claim 14 wherein said amount of flow of said EDM liquid is reduced substantially to zero when said localized magnetic field is decreased.

16. The method defined in claim 1 wherein said parameter of the EDM process is a deviation of shape from said electrode to be reproduced in said cavity and said parameter of said localized magnetic field is the strength thereof.

17. The method defined in claim 1 wherein said parameter of the EDM process is a deviation in size and shape of the contour of said electrode adjacent to at least one of such localized regions of the EDM gap and to be reproduced in said cavity and said parameter of said localized magnetic field is the strength thereof at said at least one of localized regions.

18. The method defined in claim 1, further comprising magnetically retaining said electrode to a support therefor with said localized magnetic field.

19. An electrical discharge machining apparatus for an EDM process, comprising:
an electric discharge machining electrode;
means for supporting a conductive workpiece in spaced juxtaposition with said electrode to define an EDM machining gap therewith;
means for relatively displacing said electrode and said workpiece so that the generation of electrical discharges across said gap progressively advances a recess in said workpiece;
means for feeding an electric discharge machining liquid to said gap to remove material erosively removed from said workpiece by said discharges;
means for applying a succession of machining electrical pulses across said electrode and said workpiece to produce said discharges across said gap;
field-generating means for producing a localized magnetic field so as to concentrate it predominantly on a region of said gap which constitutes only a limited portion of a preselected entire area of juxtaposition of said electrode with said workpiece;
first control means associated with said field-generating means for automatically displacing said concentrated magnetic field successively over further such regions of said machining gap whereby said concentrated magnetic field ultimately sweeps over substantially said entire area of juxtaposition between said electrode and said workpiece; and
second control means for controlling at least one parameter of production and sweeping of said localized magnetic field in response to at least one process parameter of said EDM process.

20. The apparatus defined in claim 19 wherein said field-generating means includes a plurality of electromagnetic coils spaced apart and positioned to generate such localized magnetic fields respectively affecting said regions, and said control means includes circuit means for energizing said coils in succession.

21. The apparatus defined in claim 20 wherein said field-generating means further includes pole pieces electromagnetically associated with said coils, respectively, for concentrating said localized magnetic field in the region of each of said regions.

22. The apparatus defined in claim 21 wherein said pole pieces having said coils respectively associated therewith are uniformly embedded in a plate member secured to a support member for said electrode, said coils being energized by said circuit means for electromagnetically attracting said electrode to said pole pieces and thereby retaining said electrode adherent to said support member while producing such localized magnetic fields successively.

23. The apparatus defined in claim 19 wherein said field-generating means includes a plurality of magnetically permeable members embedded in a magnetically nonpermeable plate member, and a magnetic head disposed to be movable to be brought into a proximity relationship with each of said permeable members, and said first control means includes drive means for displacing said magnetic head.

24. The apparatus defined in claim 23 wherein said head comprises at least one permanent magnet.

25. The apparatus defined in claim 23 wherein said head comprises at least one electromagnet.

26. The apparatus defined in claim 19 wherein said field-generating means includes a magnetic head disposed wholly within said electrode and said first control means includes drive means for displacing said head within said electrode.

27. The apparatus defined in claim 26 wherein said head comprises at least one permanent magnet.

28. The apparatus defined in claim 26 wherein said head comprises at least one electromagnet.

29. The apparatus defined in claim 19 wherein said second control means comprises sensing means connected to said EDM gap for deriving a signal therefrom indicating that an arcing condition tends to develop in said EDM gap, and circuit means responsive to said sensing means for acting on said control means to control the timing of displacement of said localized magnetic field from one of said localized regions to another.

30. The apparatus defined in claim 19 wherein said supporting means includes means for reciprocating said electrode and thereby intermittently retracting said electrode away from said workpiece, and wherein said second control means comprises circuit means responsive to said electrode reciprocating means for acting on said field-generating means to increase the strength of said magnetic field selectively during a time period in which said electrode is retracted during each reciprocation cycle.

31. The apparatus defined in claim 19 wherein said EDM process parameter is a deviation in size and shape of the contour of such electrode adjacent to at least one of said localized regions of the EDM gap and to be reproduced in said recess, said second control means comprising means for adjusting the strength of said localized magnetic field at said at least one of localized regions.

* * * * *